3,101,252
MOLYBDENUM DISULFIDE TREATING PROCESS
Wilbur J. Tschudi, Burgettstown, and Joseph Madera, Hickory, Pa., assignors to American Metal Climax, Inc., New York, N.Y., a corporation of New York
No Drawing. Filed Aug. 8, 1960, Ser. No. 47,942
5 Claims. (Cl. 23—134)

This invention relates to a method of treating molybdenum disulfide to remove the gangue therefrom producing a substantially silica-free molybdenum disulfide product. This application is a continuation-in-part of prior copending application Serial No. 770,308, filed October 29, 1958, now abandoned, and entitled "Methods of Treating Molybdenum Disulfide."

Molybdenum disulfide has been produced commercially by grinding molybdenite ore comprised largely of granite containing molybdenum disulfide and thereafter separating the molybdenum disulfide from the gangue by flotation techniques involving the use of oily substances of various kinds. The gangue which is largely comprised of silica and is hereinafter referred to as such, is usually identified as that portion insoluble in nitric acid and soluble in hydrofluoric acid. In the usual commercial flotation-extraction processes the silica content of the molybdenum disulfide is reduced to a level below 12%. However, when a higher purity is desired as in the case of a molybdenum disulfide lubricant it is possible to reduce the silica content of the molybdenum disulfide powder to about .3% to about .5% by repeated grinding and flotation extraction until the ore has an average particle size ranging from about 10 to about 250 microns. Reduction of the silica content below the aforementioned concentrations is usually not economical by the grinding and oil flotation process.

In the past, when commercial molybdenum disulfide powders having silica contents below about .3% were desired, the refined ore was first solvent extracted to remove all oil and then subjected to chemical treating processes employing hydrofluoric acid which reacted with the silica forming volatile and water soluble compounds which were thereafter removed by retorting and water washing resulting in molybdenum disulfide powders which are substantially free of silica. Alternatively, the wet oily powdered mass was mixed with sodium and potassium bifluoride to form volatile compounds such as silicon tetrafluoride or hydrofluosilicic acid which were subsequently driven off during a following retorting operation and the water soluble alkali metal fluorides also formed were thereafter removed by washing the powder in a slurry. In either event, the resultant chemically treated molybdenum disulfide powder was rendered substantially oil-free and had to be separated from either the water wash solution or aqueous fluoride treating solution. Great difficulty has heretofore been experienced in separating the oil-free powder from the slurry because of its tendency to clog the filter preventing economical filtration of the treated powder. It has therefore been the practice to separate the powder from the water by allowing the powder to settle, decanting the clear water and returning the residue to a retort to remove the balance of the water by evaporation. The slow rate of setting of the oil-free powder and the number of processing steps required to extract the treated powder makes the settling and decantation operation not only time-consuming but a costly operation.

It is accordingly, a primary object of the present invention to provide an improved and simplified chemical treating process for reducing the silica content of molybdenum disulfide powders to a relatively low concentration which is not subject to the foregoing objections.

The foregoing and other objects of this invention are achieved by leaching oil coated molybdenum disulfide powder with an aqueous solution containing from about 3% to about 50% hydrofluoric acid followed by a water wash and thereafter by a filtration step. The powder may be specially coated with oil for purposes of the improved process using any desired method such as that set forth in U.S. Patent 2,686,156 but is preferably the molybdenite ore obtained directly from the conventional flotation-extraction process.

In accordance with the preferred practice of the present invention, the molybdenite ore is subject to a conventional flotation-extraction process, which is carried out until the silica content of the powdered ore is less than 8% and preferably from about .3% to 2%. The end product of this process, after the bulk of the water has been filtered out, is a wet, oily mass of powder containing about 16% water and up to about 7% flotation oils. Any one or a mixture of a wide variety of oils and oily substances conventionally employed in flotation-extraction processing of molybdenite ore may be utilized for the purposes of the present invention. The only requisite is that the oily substances used will wet the molybdenum disulfide powder and may be of a vegetable or petroleum origin. For example, a mixture of two parts kerosene to one part pine tar oil gives satisfactory results. Among others, any of the oily substances referred to in United States Patent No. 2,686,156 will work satisfactorily in the hydrofluoric acid leaching process.

The wet oily powder derived from the oil flotation-extraction process containing from about .3% to about 8% silica, is thereafter subjected to the aqueous hydrofluoric acid leaching process. During this process $H_2SiF_6$ and other acid and water soluble products are formed. These can then be separated easily from the molybdenum disulfide by washing with water and filtering. The concentration of the aqueous hydrogen fluoride solutions contemplated by this invention is from about 3% by weight to about 50% by weight. The temperature of the solution can range from room temperature (about 20° C.) to about 80° C., but the optimum range is from room temperature to about 50° C. The slurry is made in a concentration which will permit effective mixing and is stirred or agitated during the treatment. Good results are obtained with 100 milliliters of solution for each 100 grams of wet oily powder. Another satisfactory slurry contains equal parts by weight of acid solution and powder. It will be appreciated that the treatment time will vary depending on temperature, concentration of the HF solution, and the amount of $SiO_2$ and other acid solubles removed.

Comparative tests have shown the surprising fact that not only is the above described leaching operation almost as efficient when applied to oily powder as when applied to oil-free powder, but that it does not materially reduce the oil content. This is important, because an oil content of at least .5% is necessary to cause the powder to agglomerate and thus permit the washing away of acid and other water soluble impurities and the extraction of the bulk of the water as an incident to a filtering operation. In the prior practice as hereinbefore mentioned wherein the silica was removed from oil-free powder by chemical action, the fine powders would plug a filter and could not be washed while in the form of a filter cake. As a result the acid and water soluble materials as well as the water had to be eliminated by repeated settling and decanting operations which were very slow and expensive. While the presence of about .5% oil will permit filtering, it is preferred that at least 2% oil be present since the larger quantity improves the filtering and washing action. A further advantage of the process is that treatment in aqueous solutions at relatively low temperatures greatly reduces the hazards incident to processes which involve the use or creation of gaseous fluoride compounds.

It should be noted that if it is desired to reduce the silica content of molybdenum disulfide powder which contains insufficient oily substance to provide good filtration, the necessary or any desired additional oily substance may be added to the powder prior to the leaching operation. For this purpose any of the oily substances hereinbefore referred to having a capacity to wet the molybdenum disulfide particles may be added to the dry powder prior to the leaching operation.

The cost of removing silica by hydrogen fluoride naturally increases with the amount of silica which must be removed. Likewise, ore refinement by flotation-extraction becomes more costly as the residual silica content is reduced, with a progressively greater rate of cost increase as the residual silica becomes less. Accordingly, there is a point to which the flotation-extraction process may be carried with maximum economy when it is desired to reduce the silica content to levels in the order of .02%. At the present time the greatest economy is achieved if the silica content is reduced to about 1% by flotation-extraction and the remainder is removed by the hydrofluoric acid treatment. To achieve a reduction in silica content to 1% or less by flotation-extraction requires repeated grinding and flotation operations until the ore is reduced to a powder having a particle size in the range of 20 microns to 250 microns.

The following examples illustrate an aqueous hydrofluoric acid leaching of a typical oil-containing molybdenum disulfide powder and are provided by way of example and are not intended to be limiting in any way.

EXAMPLE I

A wet oily molybdenum disulfide powder derived from the flotation-extraction process containing 5% flotation oils and .5% silica was mixed with an equal volume of a 12% aqueous solution of hydrofluoric acid at 50° C. and the slurry was agitated for a period of four hours. The leached molybdenum disulfide powder was thereafter removed by filtration from the hydrofluoric acid solution and washed with water to remove the hydrofluoric acid and soluble fluoride compounds formed. The washed powder was simply removed from the water wash solution by filtration and was found to contain less than .02% silica.

EXAMPLE II

A wet oily molybdenum disulfide powder derived from the flotation-extraction process containing 5% flotation oils and .5% silica was mixed with an equal volume of 48% aqueous solution of hydrofluoric acid at 35° C. and the slurry was agitated for a period of one hour. The leached molybdenum disulfide powder was thereafter removed by filtration from the hydrofluoric acid solution and washed with water to remove the hydrofluoric acid and soluble fluoride compounds formed. The washed powder was removed from the water solution by filtration and was found to contain less than .02% silica.

It will be understood that in the specification as well as in the subjoined claims the compositions of the molybdenum disulfide powders and treating solutions are expressed in terms of percent by weight.

What is claimed is:

1. The method of reducing the silica content of a molybdenum disulfide powder comprising the steps of providing a finely particulated oily molybdenum disulfide powder containing at least 0.5% of an oily substance which will wet the molybdenum disulfide particles, leaching said oily powder with an aqueous solution containing from about 3% to about 50% hydrofluoric acid, and extracting said oily powder from said aqueous solution.

2. The method of reducing the silica content of a molybdenum disulfide powder comprising the steps of providing a finely particulated oily molybdenum disulfide powder containing at least 0.5% of an oily substance which will wet the molybdenum disulfide particles, leaching said oily powder with an aqueous solution containing from about 3% to about 50% hydrofluoric acid, and extracting said oily powder from said aqueous solution by filtration.

3. The method of reducing the silica content of a molybdenum disulfide powder comprising the steps of providing a finely particulated oily molybdenum disulfide powder containing at least 0.5% of an oily substance which will wet the molybdenum disulfide particles, mixing said powder with an aqueous solution containing from about 3% to about 50% hydrofluoric acid, continuing the agitation of said mixture for a period of time sufficient to react the silica with the hydrofluoric acid to the desired degree, extracting said oily powder from said mixture, washing said powder with water to remove the remaining acid and water soluble fluoride compounds formed, and extracting said oily powder from the wash water.

4. The method of reducing the silica content of a molybdenum disulfide powder comprising the steps of providing a finely particulated oily molybdenum disulfide powder containing from about 0.3% to about 8% silica and from 0.5% to about 7% of an oily substance which will wet the molybdenum disulfide particles, mixing said powder with an aqueous solution containing from about 3% to about 50% hydrofluoric acid, continuing the agitation of the mixture for a period of time sufficient to react the silica with the hydrofluoric acid to the desired degree, extracting said oily powder from said mixture, washing said powder with water to remove the remaining acid and water soluble fluoride compounds formed, and extracting said oily powder from the wash water.

5. The method of reducing the silica content of a molybdenum disulfide powder comprising the steps of providing a molybdenum disulfide powder having a particle size ranging from about 20 to about 250 microns and containing from about 0.3% to about 8% silica and from 0.5% to about 7% of an oily substance which will wet the particles, mixing said powder with an aqueous solution containing from about 3% to about 50% hydrofluoric acid, continuing the agitation of the mixture for a period of time sufficient to react the silica with the hydrofluoric acid to the desired degree, filtering said powder from said solution, washing said powder with water to remove residual acid and soluble silica compounds therefrom, and extracting said powder from the wash water by filtration.

References Cited in the file of this patent

UNITED STATES PATENTS

| | | |
|---|---|---|
| 2,367,946 | Kaercher | Jan. 23, 1945 |
| 2,686,156 | Arntzen | Aug. 10, 1954 |